United States Patent [19]

James et al.

[11] Patent Number: 5,682,016
[45] Date of Patent: Oct. 28, 1997

[54] FILTER CAGE

[75] Inventors: Brent A. James; Garrick D. James, both of Williamsville, N.Y.

[73] Assignee: Diversified Control, Inc., Orchard Park, N.Y.

[21] Appl. No.: 219,632

[22] Filed: Mar. 29, 1994

[51] Int. Cl.⁶ .................. H02G 3/08; H02G 3/18
[52] U.S. Cl. .......... 174/52.1; 174/65 R; 220/3.8; 220/4.02
[58] Field of Search .............. 174/52.1, 60, 63, 174/64, 65 R, 50, 48, 51

[56] References Cited

U.S. PATENT DOCUMENTS

| | | | |
|---|---|---|---|
| 2,480,805 | 8/1949 | Buckels | 174/48 |
| 2,933,549 | 4/1960 | Antonucci | 174/48 |
| 4,243,834 | 1/1981 | Logioco | 174/60 |
| 4,382,649 | 5/1983 | Meyer | 174/60 |
| 4,459,429 | 7/1984 | Docimo | 174/65 R |
| 4,785,140 | 11/1988 | Adams et al. | 174/50 |
| 4,805,073 | 2/1989 | Johnson et al. | 174/50 |
| 5,272,279 | 12/1993 | Filshie | 174/50 |
| 5,326,931 | 7/1994 | Cain et al. | 174/48 |
| 5,430,248 | 7/1995 | Levy | 174/60 |
| 5,545,847 | 8/1996 | Lynes et al. | 174/52.1 |

Primary Examiner—Teresa J. Walberg
Assistant Examiner—Sam Paik
Attorney, Agent, or Firm—Joseph P. Gastel

[57] ABSTRACT

A filter cage for impeding access to a cable filter within an enclosure having an enclosure wall and a plurality of bosses extending outwardly therefrom and containing a cable filter and associated cables, the filter cage including a cage wall, a pair of side walls and a pair of end walls depending from the cage wall, cutouts in the end walls for receiving the cables, apertures in the cage wall for receiving screws for fastening the filter cage to the bosses, openings in the cage wall for permitting viewing of the filter within the cage, the end walls and side walls being spaced so as to abut the bosses on the enclosure wall to thereby locate the apertures in the cage wall in proper alignment with the bosses for receiving screws which pass through the apertures and into the bosses.

39 Claims, 3 Drawing Sheets

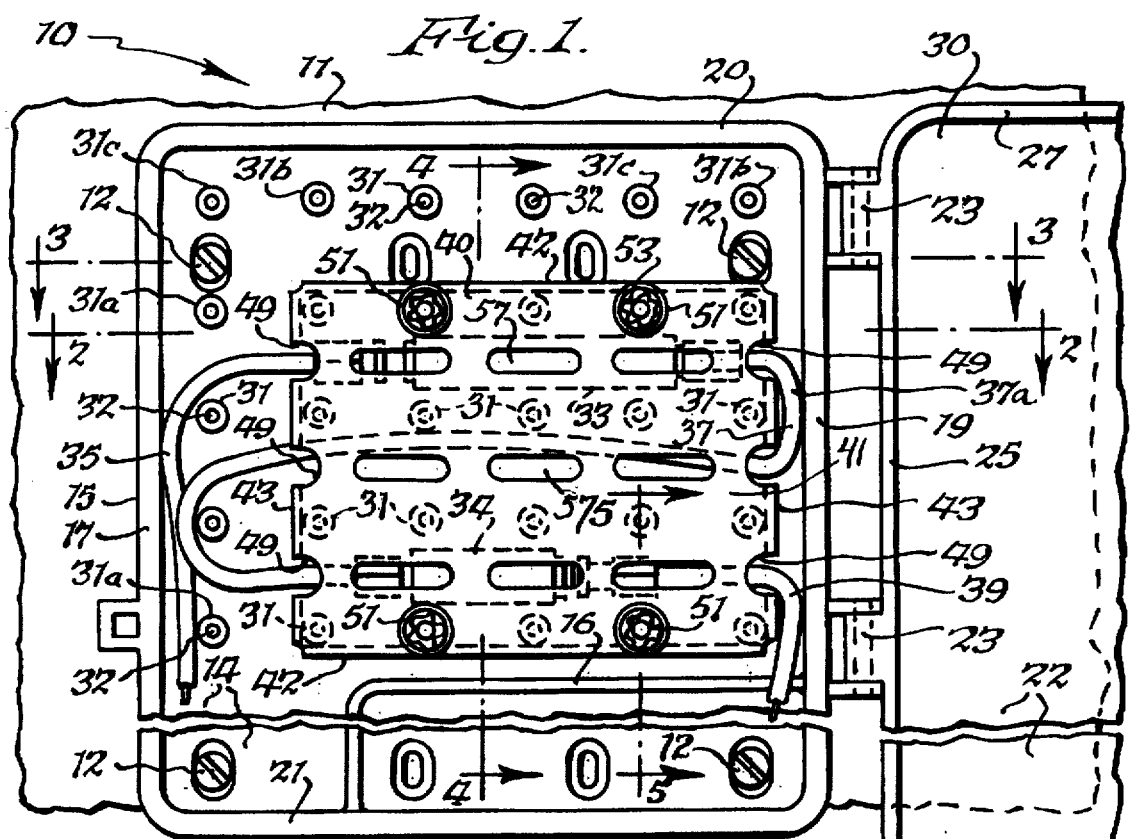

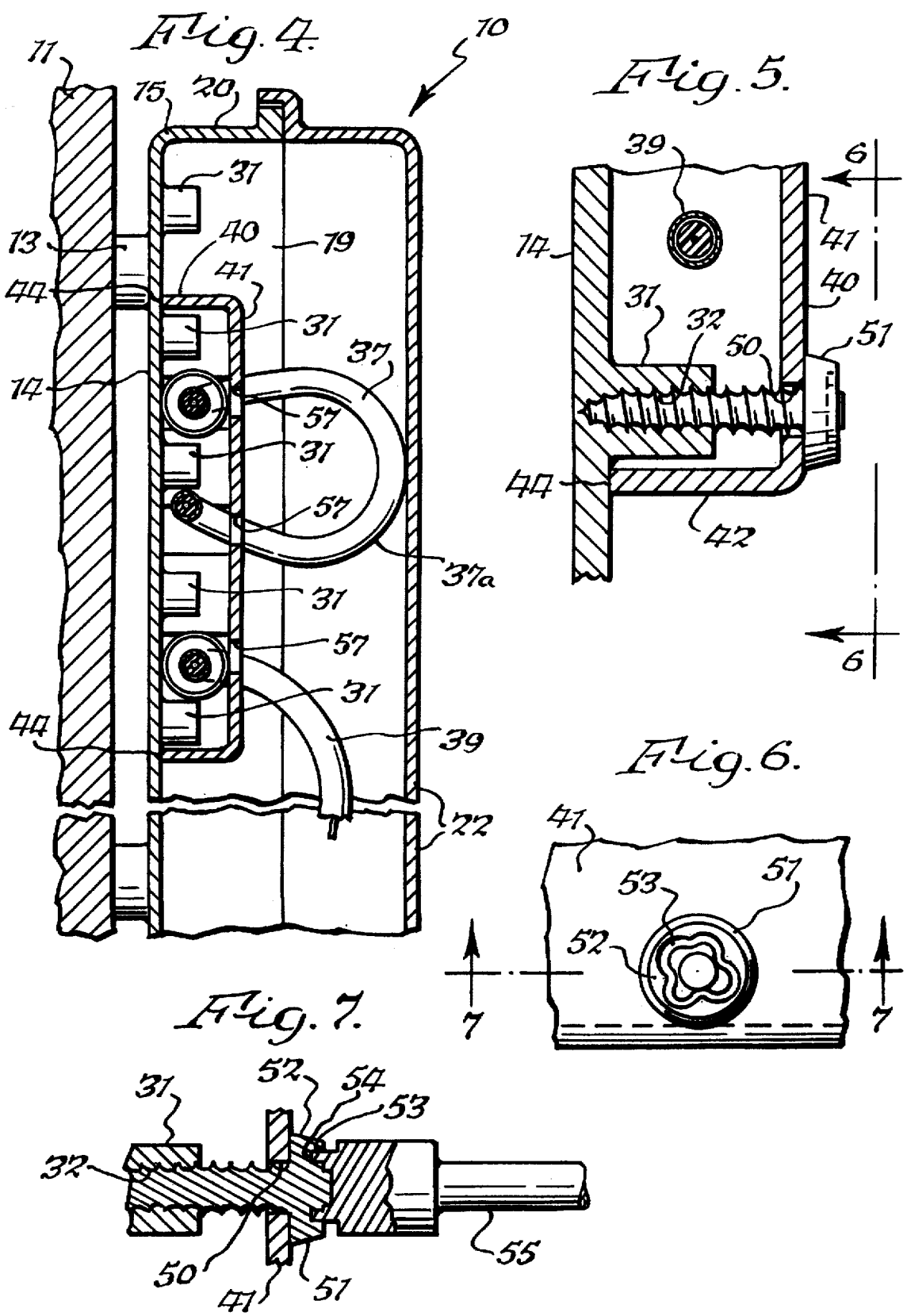

FILTER CAGE

BACKGROUND OF THE INVENTION

The present invention relates to a filter cage for mounting in an enclosure such as an on-premise addressable enclosure utilized to house cable TV filters.

By way of background, on-premise addressable closures are commonly attached to outside walls of buildings for the purpose of housing television cables and filters. The filters are utilized to permit signals of premium cost programs to pass therethrough. However, the enclosures are easily opened and theft of filters readily occurs. It is with impeding the theft of filters that the present invention is concerned.

SUMMARY OF THE INVENTION

It is accordingly one object of the present invention to provide a filter cage for mounting in an enclosure which contains filters to impede access to the filters, and thereby tend to prevent theft thereof.

Another object of the present invention is to provide a filter cage which is dimensioned in such a manner so that screw-receiving openings in the cage and on the enclosure are automatically aligned.

A further object of the present invention is to provide a filter cage having cutaway portions therein which permit easy manipulation of cables leading to and from filters within the cage.

Yet another object of the present invention is to provide a filter cage having openings therein to permit viewing of the filters for identification purposes. Other objects and attendant advantages of the present invention will readily be perceived hereafter.

The present invention relates to a filter cage comprising a cage wall, a plurality of walls depending from said cage wall, cutout means in certain of said walls for receiving cables, and aperture means in said cage wall for receiving screws for fastening said filter cage to a foreign body.

The present invention also relates to a filter cage for an enclosure having an enclosure wall and a plurality of bosses with bores therein extending outwardly from said enclosure wall and a cable filter and associated cables located proximate said enclosure wall, said filter cage containing said cable filter and thus impeding access thereto and comprising a cage wall, side wall means extending from said cage wall, end wall means extending from said cage wall, cutout means in said end wall means for receiving said cables, aperture means in said cage wall for receiving screws for fastening said filter cage to said bosses, said end wall means and said side wall means being spaced so as to coact with said bosses to locate said aperture means in said cage wall in proper alignment with said bores in said bosses for receiving screws which pass through said apertures and into said bores.

The various aspects of the present invention will be more fully understood when the following portions of the specification are read in conjunction with the accompanying drawings wherein:

BRIEF DESCRIPTION OF THE DRAWINGS

FIG. 1 is a fragmentary plan view of an on-premise addressable enclosure containing the filter cage of the present invention mounted therein;

FIG. 2 is a fragmentary cross sectional view taken substantially along line 2—2 of FIG. 1;

FIG. 3 is a fragmentary cross sectional view taken substantially along line 3—3 of FIG. 1 and showing the addressable enclosure secured to the wall of a building;

FIG. 4 is a enlarged fragmentary cross sectional view taken substantially along line 4—4 of FIG. 1;

FIG. 5 is a greatly enlarged cross sectional view taken substantially along line 5—5 of FIG. 1 and showing an attachment screw extending through an aperture in the cage and secured to a boss within the addressable enclosure;

FIG. 6 is a fragmentary view taken substantially in the direction of arrows 6—6 of FIG. 5 and showing the head of the attachment screw;

FIG. 7 is a fragmentary cross sectional view taken substantially along line 7—7 of FIG. 6 and showing a key coupled to the attachment screw for turning it;

DESCRIPTION OF THE PREFERRED EMBODIMENTS

Figure 8:
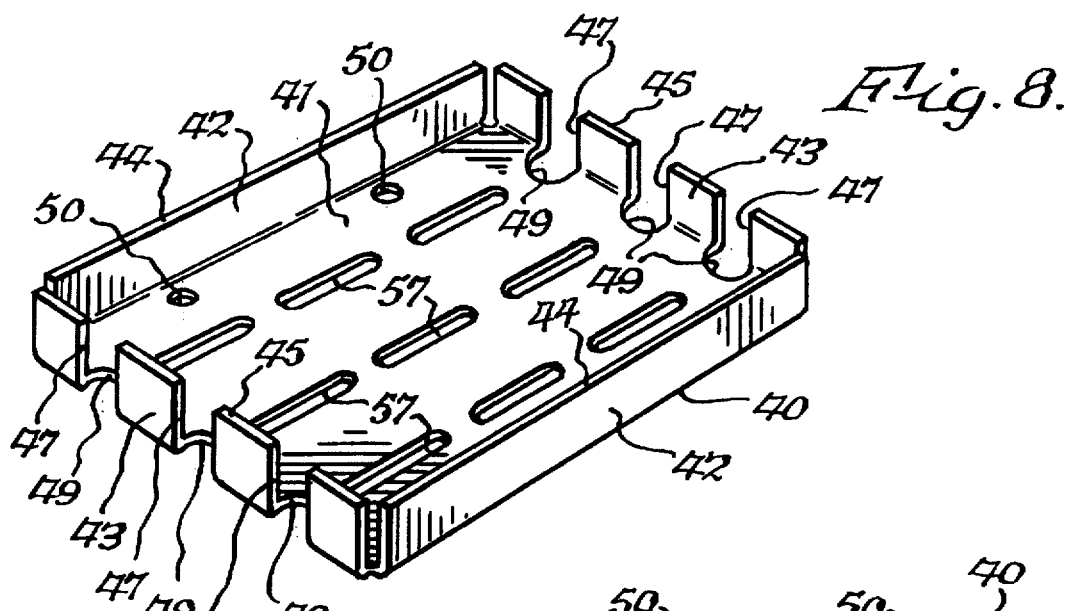
FIG. 8 is a perspective view of the cage.

Supplementing the above description, there is in common usage a device known as an on-premise addressable enclosure 10 which is secured to an external wall 11 of a building by a plurality of screws 12 which extend through bosses 13 formed integrally with rear wall 14 of molded plastic bottom section 15 of enclosure 10. Extending upwardly from rear wall 14 are side walls 17 and 19 and end walls 20 and 21. Also an intermediate wall 16 extends upwardly from rear wall 14. A molded plastic cover 22 is attached to side wall 19 by a plurality of hinges 23. Cover 22 has side walls 24 and 25 and end walls 27 and 29 which depend from front wall 30. As can be seen from FIGS. 2, 3 and 4, cover 22 has as much depth as bottom section 15. A plurality of bosses 31 are molded integrally with rear wall 14. Bosses 31 are oriented in horizontal and vertical lines (FIG. 1), and they are equidistantly spaced from each other horizontally and vertically. Each of the bosses 31 has a central bore 32 therein (FIGS. 1 and 5). The foregoing structure is in common usage and forms no part of the present invention other than the manner in which it is combined with the filter cage of the present invention. Additionally, it is to be noted that other parts of the enclosure 10 have not been shown inasmuch as they are not relevant to the present invention.

The enclosure 10 is utilized for mounting cable filters, such as 33 and 34, which have cylindrical bodies. In the type of installation shown, an input cable 35 is connected to one end of filter 33 and an output cable 37 leads from the opposite end of filter 33 to one end of filter 34 and an output cable 39 leads from the opposite end of filter 34 to the consumer. The purpose of filters, such as 33 and 34, is to filter out certain frequencies to permit a cable TV user to obtain certain programs which could not otherwise be obtained from the cable in the absence of the filters. All of the above described structure including the enclosure 10, the filters 33 and 34, and the cables are in common usage and are relevant to the present invention only insofar as they are associated with the filter cage 40 of the present invention.

In accordance with the present invention, the filter cage 40 is mountable into the enclosure 10 for the purpose of enclosing filters, such as 33 and 34, to prevent access thereto and thus tend to deter theft of these filters. As explained briefly above, in the absence of filter cage 40, the filters 33 and 34 could be accessed by merely opening cover 22. Thus, these filters could easily be stolen by a thief who would open cover 22 and detach the filters from their cables. The cage 40 impedes the theft of the filters.

The filter cage 40 (FIGS. 1 and 8) is fabricated from heavy gauge sheet metal, and it includes a cage wall 41 having depending opposed side walls 42 and opposed end walls 43. Side walls 42 terminate at edges 44 and side walls 43 terminate at edges 45. When the filter cage is fully installed, the edges 44 and 45 are in adjacent relationship to wall 14, that is, edges 44 and 45 may touch wall 14 or they may be spaced therefrom. Both end walls 43 have cutouts 47 therein which extend up into cutout portions or extensions 49 in cage wall 41. Apertures 50 are provided in cage wall 41 for receiving screws 51 which extend through apertures 50 and are received in bores 32 of bosses 31.

Figure 9:
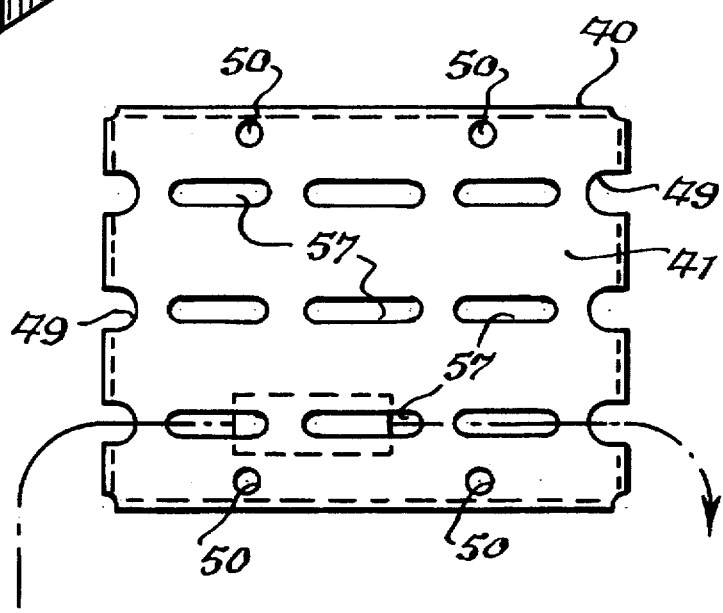
FIG. 9 is a plan view showing one manner in which a cable filter can be located within the cage.

Further in accordance with the present invention, the two walls 42 and the two walls 43 are each spaced from each other multiples of the distance between the distance between adjacent bosses so that the cage 40 can be positioned with four bosses 31 located at the four inside corners of side walls 42 and end walls 43 (FIG. 1). The apertures 50 (FIGS. 8 and 9) are located in cage wall 41 in such positions that they will then be in direct line with the bores 32 of the bosses 31 which are located between the four bosses at the corners of the cage. Therefore, there need be no careful adjustment of the installed cage 40 in order to align the apertures 50 with the holes 32 in the bosses to receive screws. In other words, the mere placement of the cage onto back wall 14 with any four of the bosses 31 at the four inside corners of the cage will automatically align apertures 50 with bores 32 of the bosses which are located between the four bosses at the corners of the cage.

The cables 35 and 39 pass through cutouts 47 and cable 37 passes through cutout extension 49. The cutout extensions 49 in cage wall 41 permit the cable 37 to be looped upwardly at 37a (FIG. 4) because otherwise there would not be sufficient room between cage wall 43 and adjacent wall 19 to permit the cable to bend. As can be seen from FIG. 4, return bend 37a can extend up into cover 22 which has sufficient room to receive it. The cables pass through cutouts 47 or cutout extensions 49, depending on the most expedient path which is required, especially considering the extra room in cover 22 for receiving the cables.

It will be appreciated that cage 40 need not be positioned as shown in FIG. 1 but it may be moved so that the left-hand corners of the cage receive bosses 31a, whereupon the apertures 50 will also be aligned with bosses 31 which exist immediately to the left of the bosses which receive the screws in FIG. 1. Also it will be appreciated that cage 40 can be shifted upwardly so that its upper corners receive bosses 31b, and, in this instance, the apertures 50 will also be aligned with bosses 31 for receiving screws. Also, if desired, the cage 40 can be shifted diagonally to the left so that its upper corners receive bosses 31c, and in this instance the apertures 50 will also be aligned over other bosses. In addition, the cage 40 can be rotated 90° and placed in a plurality of positions wherein different sets of bosses 31 are at the four corners of the cage. In this situation also, the apertures 50 will always be in alignment with the bores 32 of intermediate bosses. It is to be noted that when the cage 40 is in any of the above positions, it cannot be shifted.

The screws 51 (FIGS. 1, 6 and 7) have heads 52 which are frustoconical so that they cannot be gripped by a wrench. Additionally, the heads 52 have curvilinear grooves 53 therein for receiving a mating curvilinear ridge 54 of a key or wrench 55 which is used to install and remove screws 51. Thus, the screws cannot be removed by means of an ordinary wrench or screwdriver.

Figure 10:
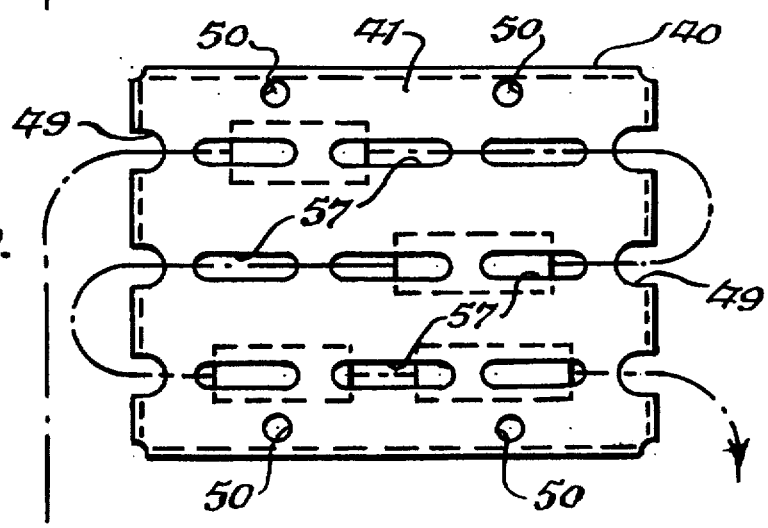
FIG. 10 is an additional view of how a plurality of filters may be located within the cage.

Another feature of filter cage 40 is the fact that cage wall 41 has a plurality of openings 57 (FIGS. 1 and 8) therein which permit viewing of the filters 33 and 34 therethrough. This is important because different types of filters have different colors, and thus the filters can be identified as to type by merely viewing them through openings 57. As can be seen from FIGS. 1, 9 and 10, the filter cage 40 can accommodate different placements and numbers of filters.

While the above description has characterized the filter cage as having two side walls 42 and two end walls 43, it will be appreciated that one end wall or one side wall can be eliminated so that it has only three walls. In a situation of this type, the open side would be placed adjacent a wall, such as 16, 17, 19 or 20, which would prevent access to the filters in the cage.

It will be appreciated that the filter cage 40 of the present invention is thus manifestly capable of impeding unauthorized access to cable filters, and while preferred embodiments of the present invention have been disclosed, it will be appreciated that it is not limited thereto but may be otherwise embodied within the scope of the following claims.

What is claimed is:

1. In an enclosure having an enclosure wall and a plurality of spaced bosses extending outwardly from said enclosure wall and containing at least one cable filter connected between input and output cables and located proximate said enclosure wall, a cage for enclosing said cable filter comprising a cage wall located in spaced relationship to said enclosure wall, side wall means extending transversely to said cage wall, first edge means on said side wall means located in adjacent relationship to said enclosure wall, end wall means extending transversely to said cage wall, second edge means on said end wall means located in adjacent relationship to said enclosure wall, cutout means in said end wall means for receiving said input and output cables, and aperture means in said cage wall for alignment with said bosses for receiving screws which screw into said bosses to thereby secure said cage to said enclosure wall.

2. In an enclosure as set forth in claim 1 including opening means in said cage wall to permit viewing of said cable filter therethrough.

3. In an enclosure as set forth in claim 1 wherein said cutout means extend over into said cage wall for permitting at least one of said cables to pass therethrough.

4. In an enclosure as set forth in claim 3 including opening means in said cage wall to permit viewing of said cable filter therethrough.

5. In an enclosure as set forth in claim 1 wherein said side wall means comprise at least one side wall, and wherein said end wall means comprise first and second end walls, and wherein said cutout means comprise at least one first cutout in said first end wall and at least one second cutout in said second end wall.

6. In an enclosure as set forth in claim 5 including opening means in said cage wall to permit viewing of said cable filter therethrough.

7. In an enclosure as set forth in claim 5 wherein at least one of said first and second cutouts extends over into said cage wall.

8. In an enclosure as set forth in claim 7 including opening means in said cage wall to permit viewing of said cable filter therethrough.

9. In an enclosure as set forth in claim 5 wherein both said first and second cutouts extend over into said cage wall.

10. In an enclosure as set forth in claim 5 wherein said cable filter comprises a member having opposite ends to which said input and output cables are connected, and wherein said input cable passes through said first cutout, and said output cable passes through said second cutout.

11. In an enclosure as set forth in claim 10 including opening means in said cage wall to permit viewing of said cable filter therethrough.

12. In an enclosure as set forth in claim 10 wherein said member has a longitudinal axis, and wherein said longitudinal axis is in alignment with said first and second cutouts.

13. In an enclosure as set forth in claim 12 including opening means in said cage wall to permit viewing of said cable filter therethrough.

14. In an enclosure as set forth in claim 1 wherein said end wall means comprise at least one end wall, and wherein said side wall means comprise first and second side walls, and wherein said cutout means comprise at least one cutout in said end wall.

15. In an enclosure as set forth in claim 14 including opening means in said cage wall to permit viewing of said cable filter therethrough.

16. In an enclosure as set forth in claim 14 wherein said cutout extends over into said cage wall.

17. In an enclosure as set forth in claim 16 including opening means in said cage wall to permit viewing of said cable filter therethrough.

18. In an enclosure as set forth in claim 1 wherein said bosses are spaced from each other both horizontally and vertically and wherein said side wall means comprise a first pair of walls which are spaced apart, and wherein said end wall means comprise a second pair of walls which are spaced apart so that said first pair of walls and said second pair of walls substantially abut spaced first bosses having at least one second boss therebetween so that said aperture means are positioned in alignment with said at least one second boss.

19. In an enclosure as set forth in claim 18 wherein a plurality of second bosses are located between said spaced first bosses, and wherein said aperture means comprise a plurality of apertures in alignment with said second bosses.

20. In an enclosure as set forth in claim 19 including opening means in said cage wall to permit viewing of said cable filter therethrough.

21. In an enclosure as set forth in claim 19 wherein said plurality of apertures are located immediately adjacent said pair of first walls.

22. In an enclosure as set forth in claim 21 including opening means in said cage wall to permit viewing of said cable filter therethrough.

23. In an enclosure as set forth in claim 21 wherein said cutout means extend over into said cage wall for permitting said cable to pass therethrough.

24. In an enclosure as set forth in claim 23 including opening means in said cage wall to permit viewing of said cable filter therethrough.

25. In an enclosure as set forth in claim 15 wherein said side wall means comprise a pair of side walls, and wherein said end wall means comprise a pair of end walls, and wherein said pair of side walls are spaced apart and said pair of end walls are spaced apart so that said pair of end walls substantially abut spaced first bosses having at least one second boss therebetween so that said aperture means are positioned in alignment with said at least one second boss.

26. In an enclosure as set forth in claim 25 wherein said cutout means are located in said pair of end walls.

27. In an enclosure as set forth in claim 26 including opening means in said cage wall to permit viewing of said cable filter therethrough.

28. In an enclosure as set forth in claim 26 wherein said cutout means extend over onto said cage wall.

29. In an enclosure as set forth in claim 28 including opening means in said cage wall to permit viewing of said cable filter therethrough.

30. A filter cage for mounting within an enclosure containing cables and for enclosing at least one filter connected between said cables comprising a cage wall, a plurality of depending walls depending from said cage wall, outer edges on said depending walls, cutout means in said depending walls for receiving said cables, said cutout means extending through said outer edges of said side walls, and aperture means in said cage wall for receiving screws for fastening said filter cage to said enclosure.

31. A filter cage as set forth in claim 30 wherein said cutout means extend into said cage wall.

32. A filter cage as set forth in claim 31 including opening means in said cage wall for viewing a filter therethrough.

33. A filter cage as set forth in claim 31 wherein said depending walls comprise a pair of side walls and at least one end wall.

34. A filter cage as set forth in claim 31 wherein said depending walls comprise a pair of side walls and a pair of end walls.

35. A filter cage as set forth in claim 31 wherein said depending walls comprise a pair of end walls, and at least one side wall.

36. In an enclosure having an enclosure wall and a plurality of bosses with bores therein extending outwardly from said enclosure wall and a cable filter and associated cables located proximate said enclosure wall, a filter cage for containing said cable filter and thus impeding access thereto comprising a cage wall, side wall means extending from said cage wall, end wall means extending from said cage wall, cutout means in said end wall means for receiving said cables, aperture means in said cage wall for receiving screws for fastening said filter cage to said bosses, said end wall means and said side wall means being spaced so as to abut said bosses to locate said aperture means in said cage wall in proper alignment with said bores in said bosses for receiving screws which pass through said apertures and into said bores.

37. In an enclosure as set forth in claim 36 including openings in said cage wall to permit viewing of said filter therethrough.

38. In an enclosure as set forth in claim 36 wherein said cutout means extend into said cage wall.

39. In an enclosure as set forth in claim 36 including openings in said cage wall to permit viewing of said filter therethrough.

* * * * *